Dec. 2, 1952         E. J. ANDERSON         2,620,200
FOLDABLE HARROW TRAILER
Filed Sept. 18, 1950                         3 Sheets-Sheet 1
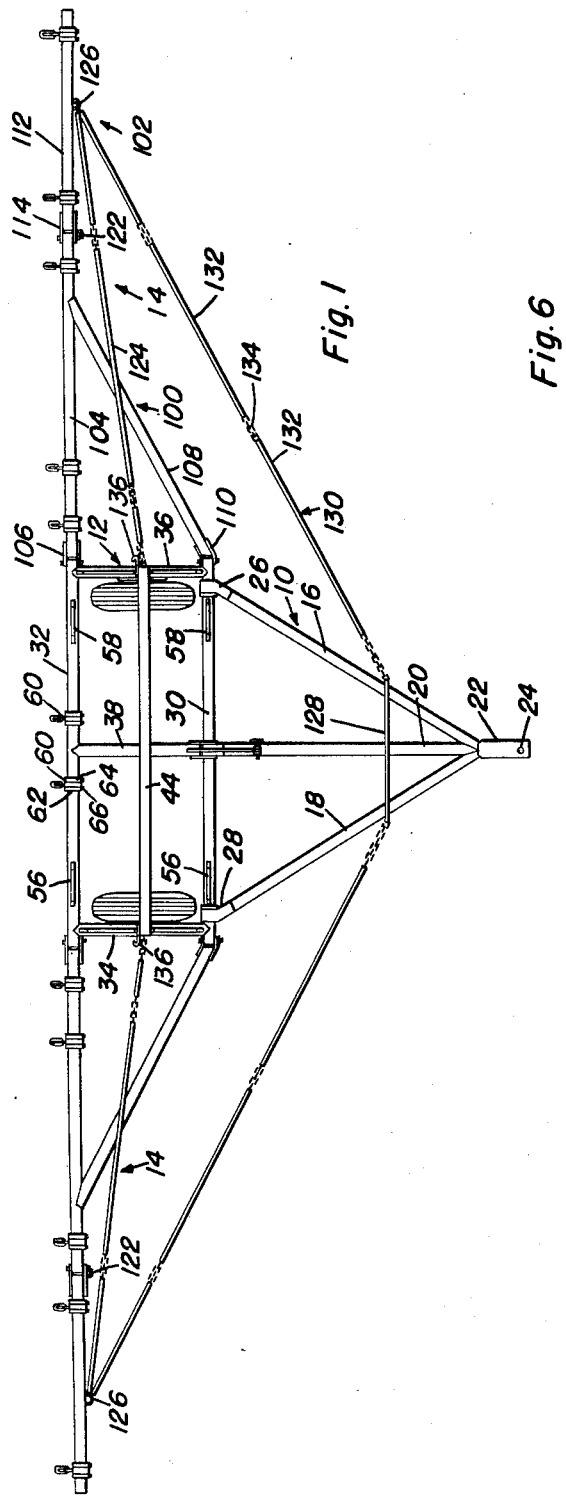
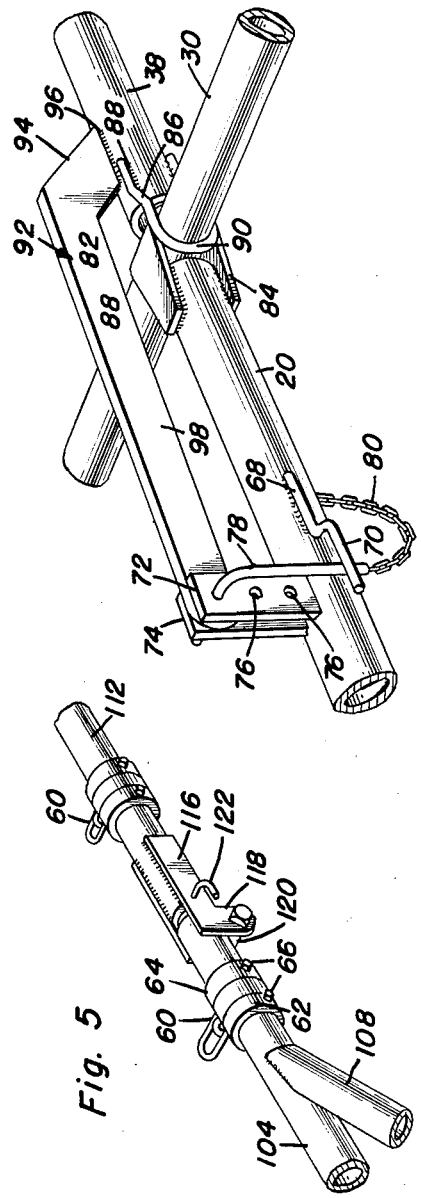
Ervie J. Anderson
INVENTOR.
BY *Clarence A. O'Brien*
*and Harvey B. Jacobson*
Attorneys

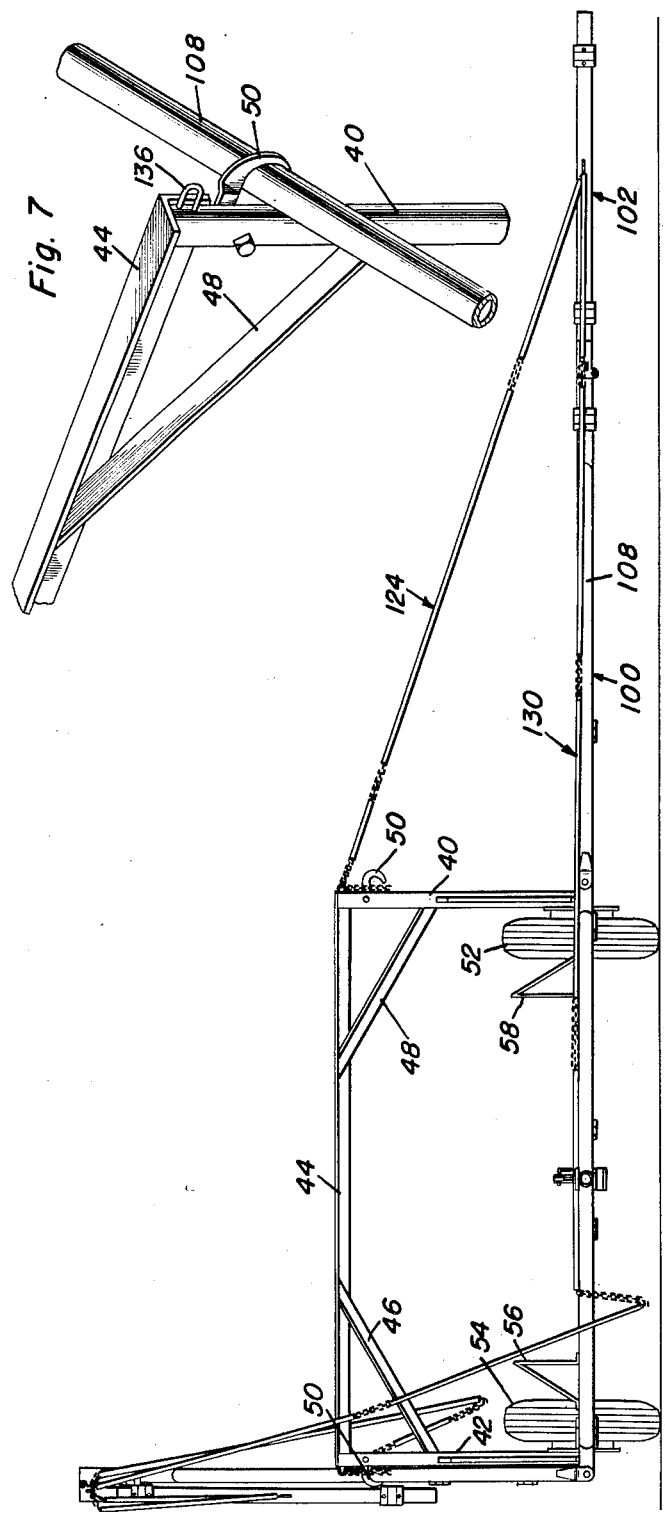

Dec. 2, 1952 — E. J. ANDERSON — 2,620,200
FOLDABLE HARROW TRAILER.

Filed Sept. 18, 1950 — 3 Sheets-Sheet 3

Ervie J. Anderson
INVENTOR.

BY Clarence A. O'Brien
and Harvey B. Jacobson
Attorneys

Patented Dec. 2, 1952

2,620,200

UNITED STATES PATENT OFFICE 2,620,200

FOLDABLE HARROW TRAILER

Ervie J. Anderson, Sheldon, Iowa, assignor of fifty per cent to John E. Anderson, Sheldon, Iowa Application September 18, 1950, Serial No. 185,455

1 Claim. (Cl. 280—33.44)

The present invention relates to improvements in harrow trailers, and more particularly to the type of harrow trailer which is adapted to be folded whereby the same may be transported down the highway or when it is desired to store the trailer.

An object of the present invention is to provide an improved harrow trailer whereby the capacity thereof is increased and which is of foldable construction whereby the same may be folded to an inoperative position for transporting and storage purposes.

A further object of the present invention is to provide a novel means whereby the harrow trailer may be angularly adjusted with respect to the tow bar means.

Still another object of the present invention resides in the novel means whereby the various portions of the harrow trailer are hingedly connected to each other and supported in folded position.

Still another object of the present invention is to provide such means that are economical of manufacture and simple in construction.

Various other objects and advantages will become apparent from the detailed description to follow.

The best form in which I have contemplated applying my invention is clearly illustrated in the accompanying drawings, wherein:

Figure 1 is a top plan view of the present invention;

Figure 2 is a front elevational view showing one side in folded, inoperative position and the other side in its extended position whereby agricultural implements may be attached thereto;

Figure 5 is a detail perspective view of the hinged connection shown in Figure 1;

Figure 6 is a detail perspective view of the adjustable means shown in Figure 1; and Figure 7 is a detail perspective view showing the hook means for releasably holding the drawbar extensions in their upper inoperative positions.

Figure 3:
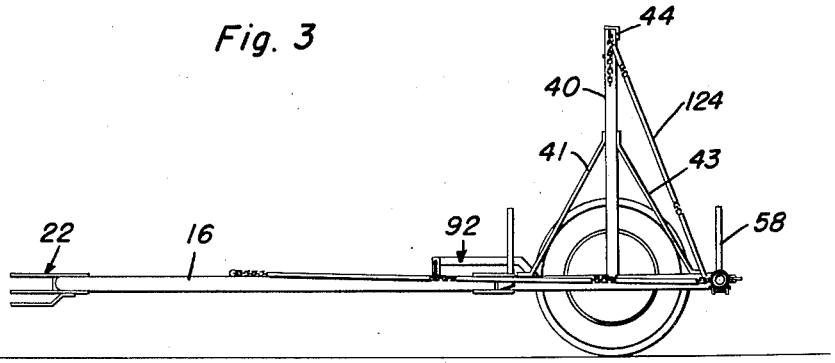
Figure 3 is a side elevational view with the drawbar extensions in their lowered positions.
Figure 4:
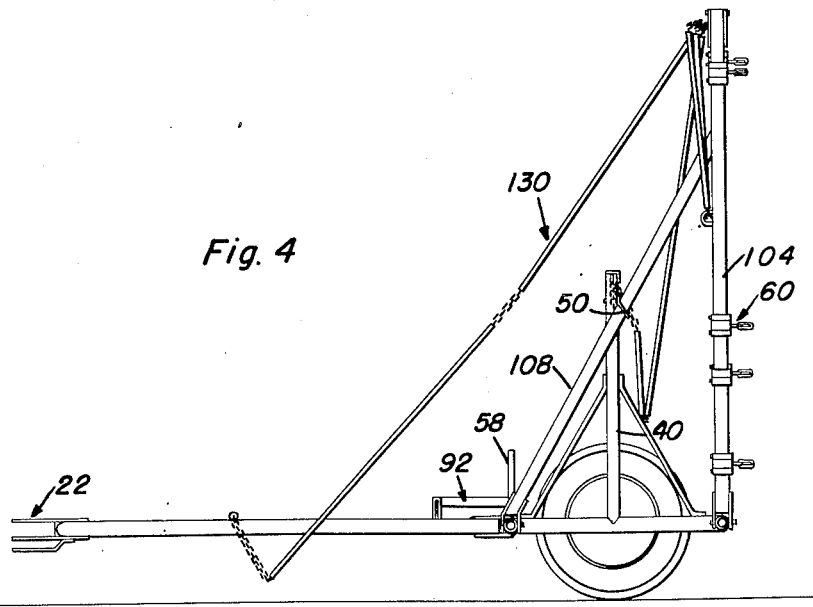
Figure 4 is a side elevational view with the drawbar extensions in their upper and folded positions.

Referring more particularly to the drawings, wherein like numerals designate like parts throughout, the numeral 10 designates generally the tow frame which is adapted to be connected to a tractor or the like, the numeral 12 designates generally the wheeled frame means which is pivotally and adjustably attached to the tow frame 10, and the numeral 14 designates generally the drawbar extensions which are hingedly connected to the wheeled frame means 12.

The tow frame 10 is comprised of a pair of rods 16 and 18 angularly disposed with respect to each other and fixedly attached to the longitudinally disposed bar 20, the forward end of the rods 16 and 18 and the bar 20 being formed with a connecting end 22 having an aperture 24 whereby the tow frame 10 may be connected to a tractor or the like. The trailing ends of the bars 16 and 18 are formed with sleeve portions 26 and 28.

The wheeled frame means 12 is comprised of front and rear bars 30 and 32 and side bars 34 and 36 connected to the front and rear bars 30 and 32. The front bar 30 is adapted to receive the sleeve ends 26 and 28 of the bars 16 and 18 whereby the tow frame 10 will be pivotally attached to the wheeled frame 12. The wheeled frame 12 is also formed with a centrally disposed bar 38 which is in longitudinal alignment with the rod 20 of the tow frame 10.

The wheeled frame 12 is also formed with a pair of standards 40 and 42 which extend upwardly from intermediate portions of the side bars 34 and 36 and have their upper ends connected by the angle iron 44. Rigidifying struts 46 and 48 connect the angle iron 44 and the standards 40 and 42. Each of the standards 40 and 42 is provided with a movable curved hook 50 for a purpose to be hereinafter described.

The wheels 52 and 54 have their brake drums welded to bars which are in turn welded to the frame 12. There is no axle extending between the wheels 52 and 54.

The front and rear bars 30 and 32 are each provided with a pair of stops 56 and 58 which are adapted to support drags which are positioned therebetween. The rear bar 32 is also provided with a plurality of agricultural attaching links 60. Each of the agricultural attaching links 60 is provided with a pair of rings 62 and 64 which are disposed on either side and are provided with set screws 66 whereby the agricultural attaching links 60 may be disposed on predetermined positions on the rear bar 32.

The means whereby the wheeled frame 12 may be adjustably secured with respect to the tow frame 10 is pointed out in Figure 1 and shown in enlarged perspective view in Figure 6. The longitudinally disposed rod 20 is provided with an angulated wire rod 68 having an offset portion 70 in parallel relation thereto. The rod 20 is also provided with a pair of upwardly extending plates 72 and 74 which are provided with a plurality of vertically spaced apertures 76. An angulated rod 78 is also attached to the rod 20 by means of the chain 80.

The rear end of the rod 20 has integrally attached thereto, as by weld, an upper and a lower plate 82 and 84 which form a bifurcated end for rotatably receiving the forward bar 30 of the wheeled frame 12. The forward end of the centrally disposed bar 38 is formed with a U-shaped rod 86 which has its leg portions fixedly attached to the bar 38 by means of weld at 88. The bight portion 90 of the U-shaped element 86 is adapted to pass around the forward bar 30. The centrally disposed bar 38 is provided with a flat strap 92 which has an angulated end 94 fixedly secured thereto by means of the weld at 96. The flat strap 92 is provided with an offset portion 98 which is substantially in parallel relation to the bar 38 and is in longitudinal alignment with the rod 20. The free end of the strap 92 is formed with an aperture which is adapted to be aligned with a selected pair of apertures in the plates 72 and 74, with the angulated pins 78 being adapted to be inserted through the aligned apertures for maintaining the bar 38 in adjusted angular relation to the rod 20.

The drawbar means 14 consist of a pair of extensions which are adapted to be disposed on each side of the wheeled frame means 12. Each of the drawbar extension means 14 is comprised of an inner section 100 and an outer section 102. The inner section 100 is comprised of a bar 104 which is hingedly attached to the rear bar 32 of the wheeled frame 12 at 106. An angularly disposed bar 108 is connected to an intermediate portion of the drawbar 104 and has its outer extremity hingedly connected to the forward bar 30 of the wheeled frame 12 at 110.

The outer section 102 is comprised of a drawbar section 110 which forms a continuation of the drawbar 104 when it is in its lowermost position. The drawbar 112 and the drawbar 104 are hingedly connected together at 114, as best seen in Figure 5. The inner end of the drawbar 112 is formed with a pair of plates 116 which have downwardly extending portions 118. A pin 120 is fixedly secured to the outermost end of the drawbar 104 and has its extremities secured within the downwardly extending portions 118 of the plates 116. The plate 16 is also provided with a wire hook 122 for a purpose to be hereinafter described. The inner and outer drawbar sections 100 and 102 are also provided with a plurality of agricultural implement attaching links 60 which are secured in adjusted positions by means of the set screws 66.

Resilient connecting means are provided for supporting the entire structure in its desired relation when it is in its unfolded position. The flexible supporting elements include a connection 124 between the upper ends of the standards 40 and 42 and loops formed on intermediate portions of the outer sections of the drawbar means at 126. As seen best in Figure 1, a rod 128 is disposed over the bars 16 and 18 and the rod 20. A flexible element 130 connects each end of the rods 128 to the eyelets 126 on the outer sections 102.

The flexible elements will be seen to comprise a plurality of rods 132 which are connected together by sections of flexible chains 134.

From the foregoing description, taken in conjunction with the drawings, it is believed obvious how the device may be folded to its inoperative position for transporting or storage purposes. As the drawbar extension means 14 are pivoted upwardly, the outer sections 102 will pivot downwardly. The flexible connecting elements may then be disposed over the hooks 122 and 136 for convenience.

In view of the description hereinabove set forth, it is believed that one skilled in the art will readily see that a device has been provided which will accomplish all of the objects hereinabove set forth, and further description is therefore deemed unnecessary.

Having described the invention, what is claimed as new is:

A foldable harrow trailer comprising a rectangular wheel supported frame having parallel front and rear bars, and side bars, a pair of drawbars having inner ends pivoted to opposite ends of said rear bar for swinging upwardly and downwardly into folded and unfolded positions, respectively, a pair of brace bars extending diagonally forwardly from said drawbars to the ends of the front bar and pivoted to said ends of the front bar for swinging with said drawbars, a pair of uprights rising from said side bars intermediate the front and rear bars and provided with catches engageable with said brace bars to hold said drawbars in upswung folded position, extension drawbar sections hinged at one end to the outer ends of said drawbars for downward swinging into folded position upon upward swinging of said drawbars into folded position, said extension sections being swingable on said drawbars upwardly into unfolded position when said drawbars are unfolded, a tow frame hinged to said front bar for upward swinging thereon to folded position and downward swinging into unfolded towing position, and articulated draw rod connections between opposite sides of said tow frame and said extension sections tensioned by swinging of said tow frame and said draw bars and extension sections into unfolded position.

ERVIE J. ANDERSON.

REFERENCES CITED

The following references are of record in the file of this patent:

UNITED STATES PATENTS

| Number | Name | Date |
|---|---|---|
| 1,941,670 | Everett | Jan. 2, 1934 |
| 2,486,483 | Landon | Nov. 1, 1949 |
| 2,515,016 | McClintock | July 11, 1950 |